# 2,744,913

PROCESS FOR THE MANUFACTURE OF TETRA-AZA-PORPHIN COLORING MATTERS

Harold France, Blackley, Manchester, England, assignor to Imperial Chemical Industries Limited, a corporation of Great Britain No Drawing. Application January 29, 1953,
Serial No. 334,092

Claims priority, application Great Britain
February 6, 1952

6 Claims. (Cl. 260—314)

This invention relates to an improved process for the manufacture of colouring matters and more particularly to an improved process for the manufacture of colouring matters of the tetra-aza-porphin series.

The colouring matters made by the process of my invention are the magnesium tetra-aza-porphins which in one of their possible forms may be represented by the formula:

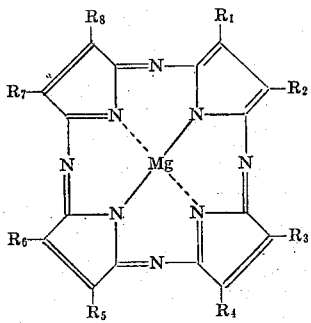

wherein $R_1$ represents an alkyl radical, $R_2$ represents a hydrogen atom or alkyl radical and $R_3$, $R_4$, $R_5$, $R_6$, $R_7$ and $R_8$ represent hydrogen atoms or hydrocarbon radicals, or one or more of the pairs of substituents $R_3$ and $R_4$, $R_5$ and $R_6$, $R_7$ and $R_8$ may be joined together to form alicyclic, aromatic or quinoid rings.

According to my invention we provide a process for the manufacturing of magnesium tetra-aza-porphins as hereinbefore defined which comprises heating an alkyl-substituted fumaric dinitrile, or mixture thereof with a different alkyl-substituted fumaric dinitrile, maleic dinitrile, a substituted maleic dinitrile, a $\Delta'$-tetrahydrophthalonitrile or a phthalonitrile, with a magnesium alcoholate or with the compound obtained by decomposing a Grignard reagent with an alcohol.

The compound obtained by decomposing the Grignard reagent, for example an alkyl magnesium halide, with an alcohol is to be regarded as a halogenomagnesium alcoholate.

The reaction is preferably carried out in an excess of the alcohol used for forming the alcoholate or for decomposing the Grignard reagent.

Suitable alcohols are for example, methyl, ethyl, propyl, butyl, amyl and tetrahydrofurfuryl alcohols, ethylene glycol and cyclohexanol, but n-propyl alcohol and n-amyl alcohol are in general preferred.

It will be apparent that when a mixture of two or more nitriles is used, the pigments obtained will be unsymmetrical in structure, but when only one nitrile is used a symmetrical pigment will be obtained in which each pyrrole nucleus carries the same pair of substituents.

As an alkyl-substituted fumaric dinitrile there may be mentioned, for example dimethylfumaric dinitrile.

Suitable substituted maleic dinitriles are for example the methyl- and dimethyl-maleic dinitriles. If desired the maleic dinitrile and/or fumaric dinitrile may be formed in situ in the reaction mixture from the corresponding succinic dinitrile.

The process is conveniently carried out by heating the reagents together in an excess of the alcohol, distilling off the alcohol, if desired under reduced pressure, extracting the readily soluble impurities from the residue and finally extracting the pigment and recrystallising it.

By the process of my invention the magnesium tetra-aza-porphins can be obtained in good yields from readily available starting materials.

The magnesium tetra-aza-porphins made by the process of my invention are themselves green, blue or violet pigments of good tinctorial strength and fastness properties, but they are especially valuable as intermediates for use in the manufacture of other tetra-aza-porphins because they can be readily demetallised to the corresponding metal-free pigments or converted by metal exchange to the corresponding pigments containing certain metals other than magnesium, for example copper or nickel, and accordingly the process of our invention provides a convenient method of obtaining the valuable copper and nickel pigments. The demetallisation can be effected by heating the magnesium pigment with an acid, for example formic or acetic acid. The metal exchange can be effected by heating the magnesium pigment in an organic solvent with a suitable metal or metallic salt, for example by heating with copper bronze or copper acetate in boiling pyridine or with nickel chloride in boiling cyclohexanone. Alternatively the metal-free pigment obtained as described can be converted to the copper pigment by heating with copper bronze in boiling pyridine or to the nickel pigment by heating with nickel chloride in boiling pyridine.

The invention is illustrated but not limited by the following examples in which the parts are by weight:

Example 1

120 parts of magnesium are dissolved in 3000 parts of anhydrous methyl alcohol and 5000 parts of n-amyl alcohol are added to the solution. The mixture is stirred and slowly distilled until the temperature of the vapour phase reaches 134–135° C., which is the boiling point of n-amyl alcohol. 212 parts of dimethylfumaricdinitrile are added to the gelatinous residue from the distillation and the mixture is then stirred and boiled for 2 hours under a reflux condenser. The excess amyl alcohol is then distilled off under reduced pressure and the dark blue residue is cooled, powdered and added slowly to 10,000 parts of 50% acetic acid below 2° C., and the suspension so obtained is stirred for a further 15 minutes below 2° C. The undissolved material is filtered off and washed with 50% acetic acid at 0° C., until the washings are colourless, and then with hot water until the washings are free from acetic acid. The residue of crude magnesium octamethyl-tetrazaporphin is dried to form a bluish-purple powder. It may be further purified by extracting it with boiling benzene containing 1–2% ethyl alcohol and cooling the benzene extract when the colouring matter crystallises out in the form of bronze-iridescent dark-bluish-purple micro-crystals which are filtered off and dried.

In place of n-amyl alcohol used in the above example, there may be used n-propyl alcohol, iso-amyl alcohol or ethylene glycol.

Example 2

400 parts of methyl iodide are added slowly to a stirred suspension of 60 parts of magnesium in 3500 parts of an anhydrous ether. The mixture is boiled gently, if necessary, to complete solution of the magnesium, and the solution is then cooled and 2500 parts of n-amyl alcohol are added slowly, the ether being allowed to boil off. The white precipitate which first forms redissolves on stirring.

212 parts of dimethylfumaric dinitrile are added and the mixture is stirred and boiled gently under a reflux condenser for 3½ hours. The formation of blue colouring matter begins a short time after the mixture commences to boil. The mixture is cooled to 10° C., 4500 parts of methyl alcohol are added to the stirred mixture below 15° C., and then 2000 parts of glacial acetic acid are added to the stirred mixture below 12° C. The insoluble microcrystalline colouring matter in suspension is filtered off immediately and washed first with a mixture of 2000 parts of methyl alcohol and 400 parts of acetic acid at 0° C., until the washings become colourless, then with methanol at 0° C., until the washings show a faint red fluorescence and finally with 10,000 parts of boiling water. The residual crude magnesium octamethyltetrazaporphin forms bronze-iridescent, small, dark bluish-purple needles which may be further purified by crystallisation as described in Example 1.

*Example 3*

120 parts of magnesium are dissolved in 3,000 parts of anhydrous methyl alcohol and 5,000 parts of n-amyl alcohol are added to the solution which is then stirred and distilled until the temperature of the vapour phase reaches 134–135° C. To the gelatinous residue there is then added a mixture of 52 parts of dimethylmaleic dinitrile and 160 parts of dimethylfumaric dinitrile and the mixture is boiled for 2 hours under a reflux condenser. The product is isolated as described in Example 1 and the bronze-iridescent dark bluish-violet micro-crystalline compound so obtained is identical with that obtained in Example 1.

*Example 4*

A mixture of magnesium n-amylate and n-amyl alcohol is prepared from 120 parts of magnesium as described in Example 1. The mixture is cooled to 90° C. and a mixture of 106 parts of dimethylfumaric dinitrile and 128 parts of phthalonitrile is added. The mixture is heated rapidly to 135° C. under a reflux condenser and stirred at 135–137° C. for 2 hours. The product is isolated as described in Example 1 when a bright navy blue powder is obtained which may be further purified by crystallisation from benzene.

Instead of the 128 parts of phthalonitrile used in the above example there may be used 132 parts of Δ'-tetrahydrophthalonitrile when a blue pigment is obtained.

*Example 5*

327 parts of the product made as described in Example 1 are dissolved in 1,000 parts of dry pyridine. The solution is boiled under a reflux condenser and 292 parts of copper acetate are added. The blue-red fluorescent solution is boiled under reflux with the copper acetate until a dull blue suspension is formed. The suspension is allowed to cool and the crude product is filtered off and washed successively with 200 parts of pyridine, 200 parts of methanol, 250 parts of dilute hydrochloric acid and finally with hot water. The product may be crystallised from o-dichlorobenzene to give a bronze iridescent dark bluish-purple microcrystalline powder.

Instead of copper acetate used in the above example an equivalent amount of copper bronze may be used.

What I claim is:

1. A process for the manufacture of magnesium tetra-aza-porphins which comprises heating (1) a member of the group consisting of alkyl-substituted fumaric dinitriles and mixtures thereof with a nitrile from the group consisting of a different alkyl-substituted fumaric dinitrile, maleic dinitrile, substituted maleic dinitriles, Δ'-tetrahydrophthalonitriles and phthalonitriles with (2) a member of the group consisting of magnesium alcoholate and the compound obtained by decomposing a Grignard reagent with an alcohol.

2. Process according to claim 1 wherein the alkyl-substituted fumaric dinitrile is dimethylfumaric dinitrile.

3. Process for the manufacture of metal-free tetra-aza-porphin pigments wherein a magnesium tetra-aza-porphin manufactured as claimed in claim 1 is demetallised by heating it with an acid.

4. Process for the manufacture of tetra-aza-porphins containing metals other than magnesium wherein a magnesium tetra-aza-porphin manufactured as claimed in claim 1 is heated in an organic solvent with a substance selected from the group consisting of metals other than magnesium and salts of such other metals.

5. Process according to claim 4, wherein said substance comprises copper.

6. Process according to claim 3, wherein the acid is selected from the group consisting of formic and acetic acids.

References Cited in the file of this patent

FOREIGN PATENTS

| | | |
|---|---|---|
| 389,842 | Great Britain | Mar. 20, 1933 |
| 480,249 | Great Britain | Feb. 18, 1938 |
| 500,448 | Belgium | July 5, 1951 |